Figure 5:
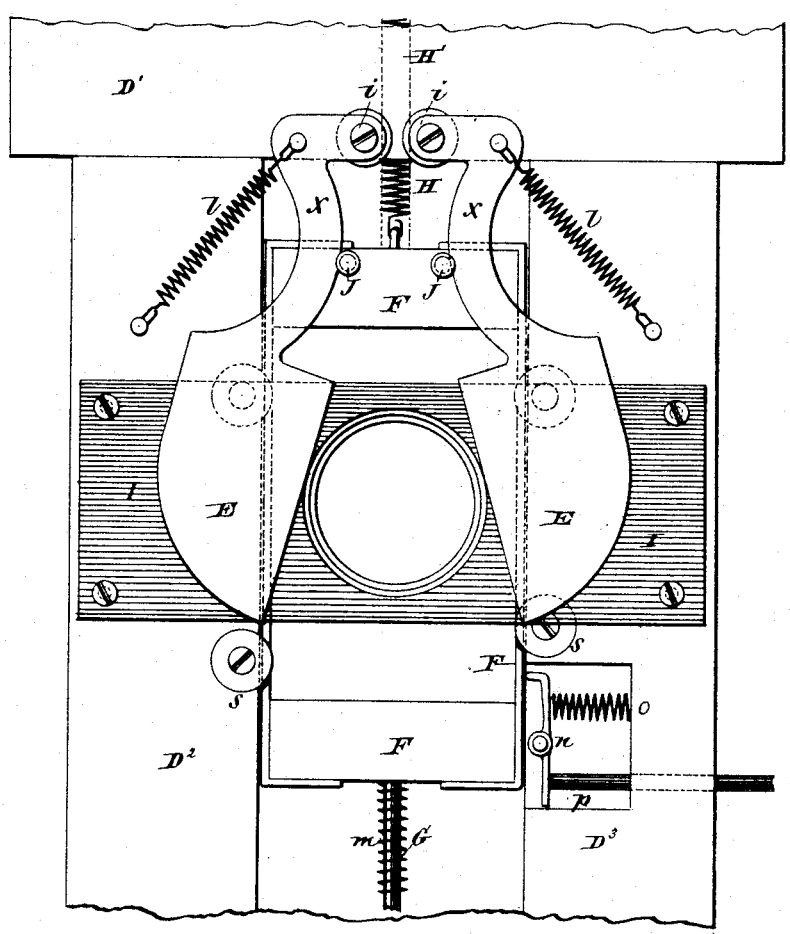

(No Model.) 2 Sheets—Sheet 1.
A. E. COLGATE.
PHOTOGRAPHIC CAMERA.
No. 437,290. Patented Sept. 30, 1890.
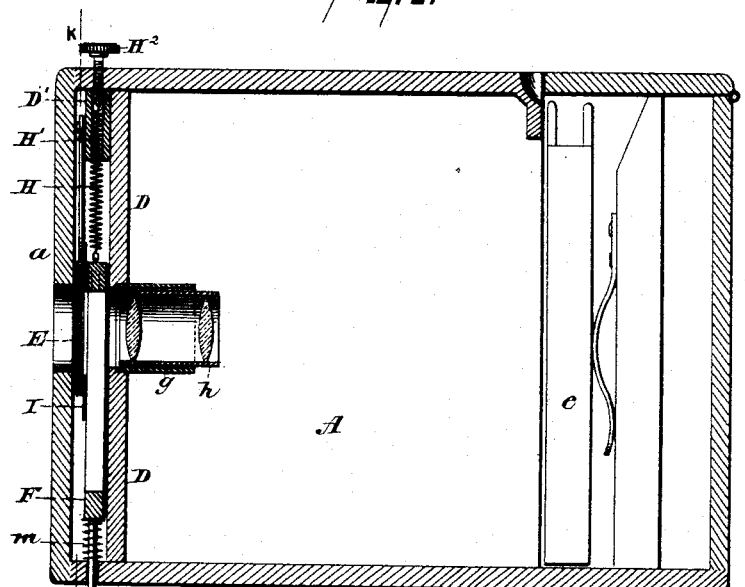
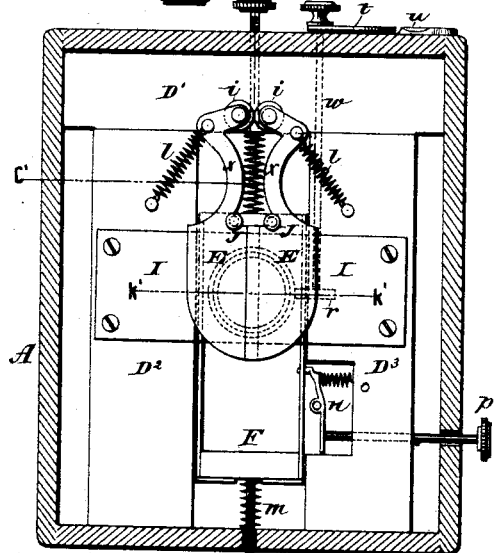
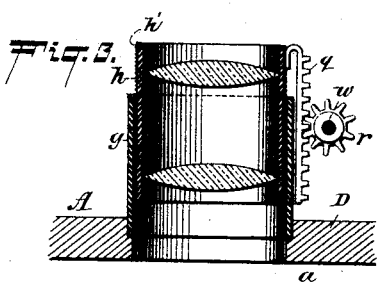
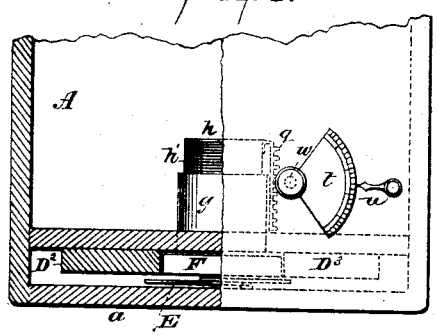
WITNESSES:
Gust. Dietend
William Goebel
INVENTOR
Arthur E. Colgate
BY Briesen & Knauth
ATTORNEYS.

UNITED STATES PATENT OFFICE.

ARTHUR E. COLGATE, OF NEW YORK, N. Y., ASSIGNOR TO F. G. OTTO & SONS, OF SAME PLACE.

PHOTOGRAPHIC CAMERA.

SPECIFICATION forming part of Letters Patent No. 437,290, dated September 30, 1890.

Application filed April 25, 1890. Serial No. 349,414. (No model.)

*To all whom it may concern:*

Be it known that I, ARTHUR E. COLGATE, a resident of the city of New York, in the county and State of New York, have invented an Improvement in Photographic Cameras, of which the following is a specification.

My invention relates to an improved attachment for a photographic camera whereby pictures can be taken by the instantaneous process, which camera will be described in a subsequent part of this specification, reference being had to the accompanying drawings, forming part thereof, in which—

Figure 1 represents a central vertical section of my improved camera on the line $cc$ of Fig. 2. Fig. 2 represents a cross-section of my camera on the lines $kk$ of Fig. 1. Fig. 3 represents a sectional view of my lens barrel or tube on the lines $k'k'$ of Fig. 2. Fig. 4 represents a top view, partly in section, of the camera, the line $c'$ indicating the plane of section. Fig. 5 represents an enlarged front view of the shutters at the instant of exposure.

My camera consists of the usual box A, having the perforated face-plate $a$, and means for retaining the sensitive plate-holder $e$.

Inside the camera and conveniently near the face-plate is a partition D, bearing a tube $g$, into which slides the lens-tube $h$. To the front of the partition D are pivoted at $ii$ one or two shutters E, each having curved arm or upper part $x$. These shutters E are adapted to be forced apart and together by means of the guide-pins $jj$ or analogous projection on the slide F, assisted, if desired, by springs $ll$. The said guide-pins $jj$ are securely attached to a sliding carrier F, to which is secured a bar G, projecting through the bottom of the box and having a suitable handle at its lower end. Around this bar between the bottom of the box and the lower portion of the sliding carrier a spiral spring $m$ may be placed to assist in the lifting of said carrier. To the upper end of the said sliding carrier F is attached a strong spiral spring H, which enters a recess H' of a projection D' of the face-plate D. A thumb-screw H² may be used to regulate the strength of said spring. The sliding carrier runs between two rails D² D³ on the partition D, or is otherwise guided, and is or may be held from slipping out from between them by the buttons S. (Shown in Fig. 5.) On one side of the sliding carrier is a catch $n$, which by a spring $o$ is forced into a hole or recess of the slide F when down. The catch $n$ connects with a rod $p$, which is adapted to release the sliding carrier by forcing the catch $n$ out of the hole in the side of the said sliding carrier. A strip I of suitable light-excluding material may be stretched across the opening behind the shutters E E, as shown, being perforated in line with the lens. It serves as a support for the shutters and helps to make them overlap tightly, so that when closed no streak of light may enter between them.

It has heretofore been customary to employ a rack attached to the sliding barrel bearing the lens; but such rack has been for its entire length attached to the barrel, and a slit cut large enough to allow the teeth to project and gear with the cog-wheel, thus allowing light to penetrate the dark chamber of the camera. I obviate this difficulty as follows: To the inner end of the lens-barrel $h$ I secure a hook-shaped rack $q$, whose main portion runs parallel to the said lens-barrel $h$ and outside the tube $g$. For further protection the lens-barrel $h$ is wound with thread or other suitable material $h'$, thus forming a light-tight joint. The hook-shaped rack $q$ lies parallel with the outer side of the tube $g$ and is adapted to gear with a cog-wheel $r$ on a shaft $w$, which projects through the box, and to which is attached a graduated scale $t$. A fixed pointer $u$, secured to the top of the box, registers with the said scale $t$.

Having now described the mechanical part of my invention, I will describe its operation. The lens-tube is adjusted to the proper distance, and the sliding carrier F is pulled down, as in Fig. 2, until the catch $n$ enters the hole in the said sliding carrier. In this position the shutters E E are held together, as in Fig. 2, and the spring H is strained or the spring $m$ contracted, or both. The sensitive plate being in position, I press the button $p$ against the catch $n$, which disengages the sliding carrier F and allows the spring H to pull or the spring $m$ to push the slide F upward. In doing this the guide-buttons $jj'$, bearing against the curved arms $x$ of the shutters E, first spread such shutters apart, as in Fig. 5, and, continuing to ascend, close them again, thus forming an instantaneous exposure. If the pins $j\ j$ enter slots in the shutters, the springs $l\ l$ may be dispensed with.

The advantages of my invention are cheap construction, effective operation, the ease with which it can be adapted to any camera, and the further fact that, the shutters when open being separated farther at their lowermost point than at their top, I am enabled to expose the foreground a longer time than the sky, and thereby obtain a better picture.

By the hook-shaped rack $q$, I am enabled to connect the pinion $r$ with the sliding tube $h$ without requiring a slot in the tube $g$ through which light might enter.

Having now described my invention, what I claim is—

1. In a photographic camera, the combination of the pivoted shutter E, having curved arm $x$ with the sliding carrier F, guide-button $j$, and means, substantially as described, for raising and lowering the said sliding carrier, as and for the purpose set forth.

2. The combination of the shutters E, having curved arms $x$, with the sliding carrier F, guide-buttons $j\ j$, and means, substantially as described, for lowering said sliding carrier, and with the catch $n$ and lifting-spring H, as specified.

3. The combination of the shutters E, having curved arms $x$, with the sliding carrier F, guide-buttons $j\ j$, springs $l\ l$, and means, substantially as described, for lowering said sliding carrier, and with the catch $n$ and lifting-spring H, as specified.

4. The partition D, carrying the opening and closing shutters E E, and the fixed tube $g$, combined with the movable lens-tube $h$, hook-shaped rack $q$, and pinion $r$, substantially as herein shown and described.

5. The fixed tube $g$, combined with the movable lens-tube $h$, and with the hook-shaped rack $q$, carried by said lens-tube, and with means, substantially as described, for moving said rack, as specified.

6. The combination of the shutters E E, and means, substantially as described, for opening and closing the same, with the perforated strip I of light-excluding material stretched behind them, substantially as herein shown and described.

ARTHUR E. COLGATE.

Witnesses:
HARRY M. TURK,
LIVINGSTON EMERY.